(12) United States Patent
Hsu et al.

(10) Patent No.: US 8,373,827 B2
(45) Date of Patent: Feb. 12, 2013

(54) SYSTEM FOR DISPLAYING IMAGES HAVING A CONDUCTIVE LAYER FORMED ON THE INNER SURFACE OF A COLOR FILTER SUBSTRATE

(75) Inventors: Su-Jung Hsu, Jhunan Township (TW); Shao-Wu Hsu, Hsinchu (TW); Dai-Liang Ting, Hsinchu (TW)

(73) Assignee: Chimei Innolux Corporation (TW)

( * ) Notice: Subject to any disclaimer, the term of this patent is extended or adjusted under 35 U.S.C. 154(b) by 586 days.

(21) Appl. No.: 12/628,722

(22) Filed: Dec. 1, 2009

(65) Prior Publication Data

US 2010/0165268 A1 Jul. 1, 2010

(30) Foreign Application Priority Data

Dec. 31, 2008 (TW) ................................ 97151731 A

(51) Int. Cl.
*G02F 1/1335* (2006.01)
*G02F 1/1343* (2006.01)
(52) U.S. Cl. .................... 349/106; 349/141; 349/147
(58) Field of Classification Search .................. 349/106, 349/141–147
See application file for complete search history.

(56) References Cited

U.S. PATENT DOCUMENTS

| 8,139,037 B2 * | 3/2012 | Furuhashi et al. | 345/173 |
| 2001/0043304 A1 * | 11/2001 | Matsumoto | 349/141 |
| 2002/0130991 A1 * | 9/2002 | Kamijo | 349/106 |
| 2007/0247570 A1 * | 10/2007 | Narutaki et al. | 349/106 |
| 2008/0018835 A1 * | 1/2008 | Li et al. | 349/106 |
| 2008/0122802 A1 * | 5/2008 | Furuhashi et al. | 345/174 |
| 2010/0002176 A1 * | 1/2010 | Kondo et al. | 349/122 |

* cited by examiner

*Primary Examiner* — Huyen Ngo
(74) *Attorney, Agent, or Firm* — Lowe Hauptman Ham & Berner, LLP

(57) ABSTRACT

A system for displaying images is provided and includes a liquid crystal display panel. The liquid crystal display panel includes a first substrate having a plurality of orthogonal data lines and scan lines thereon. A first transparent electrode layer is disposed over the data lines and a second transparent electrode layer is disposed over the first transparent electrode layer. A second substrate is disposed opposite to the first substrate and has an inner surface. A conductive layer is disposed over the inner surface of the second substrate. A liquid crystal layer is disposed between the first substrate and the second substrate.

20 Claims, 9 Drawing Sheets

SYSTEM FOR DISPLAYING IMAGES HAVING A CONDUCTIVE LAYER FORMED ON THE INNER SURFACE OF A COLOR FILTER SUBSTRATE

CROSS REFERENCE TO RELATED APPLICATIONS

This Application claims priority of Taiwan Patent Application No. 97151731, filed on Dec. 31, 2008, the entirety of which is incorporated by reference herein.

BACKGROUND OF THE INVENTION

1. Field of the Invention

The invention relates to a system for displaying images including a liquid crystal display panel, and more particularly to a conductive layer design for a color filter substrate of a liquid crystal display panel.

2. Description of the Related Art

Recently, liquid crystal displays have been applied widely to display elements of various products. An in-plane switching (IPS) liquid crystal display or a fringe-field switching (FFS) liquid crystal display is an in-plane control type liquid crystal display utilizing wide viewing angle technology.

A cross section view of a conventional IPS or FFS liquid crystal display panel 100 is shown as FIG. 1. A conductive layer 12 is disposed on a backside of a color filter substrate 10, to utilize electric conduction to eliminate static electricity in the liquid crystal display panel and avoid the problems produced from static electricity discharge. In addition, a color filter layer 14 and a planarizing layer 16 are disposed on a front side of the color filter substrate 10. A lower transparent electrode layer 22 is disposed on an array substrate 20 and an insulating layer 26 is formed on the lower transparent electrode layer 22. Then, an upper transparent electrode layer 24 is formed on the insulating layer 26. The array substrate 20 is disposed opposite to the color filter substrate 10 to sandwich a liquid crystal layer 18, and then the liquid crystal display panel 100 is completed.

The thickness of the conventional color filter substrate 10 must be thinned to satisfy requirements for light and thin products. The thinning process of the color filter substrate is usually performed on the backside thereof by an etching process. In the conventional IPS or FFS liquid crystal display panels, the conductive layer 12, to prevent static electricity discharge, is disposed on the backside of the color filter substrate 10. However, after the thinning process of the color filter substrate, the conductive layer 12 is etched, such that the function of preventing static electricity discharge is not achieved.

Therefore, a conductive layer design for color filter substrates of liquid crystal display panels that satisfy the requirements for thinning the color filter substrate and prevent static electricity discharge in the liquid crystal display panels is desirable.

BRIEF SUMMARY OF THE INVENTION

The invention provides a system for displaying images including a liquid crystal display panel. The liquid crystal display panel comprises a first substrate having a plurality of orthogonal data lines and scan lines thereon. A first transparent electrode layer is disposed over the data lines and a second transparent electrode layer is disposed over the first transparent electrode layer. A second substrate is disposed opposite to the first substrate and has an inner surface. A conductive layer is disposed over the inner surface of the second substrate and a liquid crystal layer is disposed between the first substrate and the second substrate.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

In an embodiment of a liquid crystal display panel of the present invention, a conductive layer for preventing static electricity discharge is disposed on an inner surface of a color filter substrate opposite to an array substrate to overcome the problems of the conventional liquid crystal display panels, in which the conductive layer is disappeared after thinning the color filter substrate and the function of preventing static electricity discharge is not be achieved. Meanwhile, optical characters of the liquid crystal display panel of the invention are not affected by the conductive layer on the inner surface of the color filter substrate.

Figure 1:
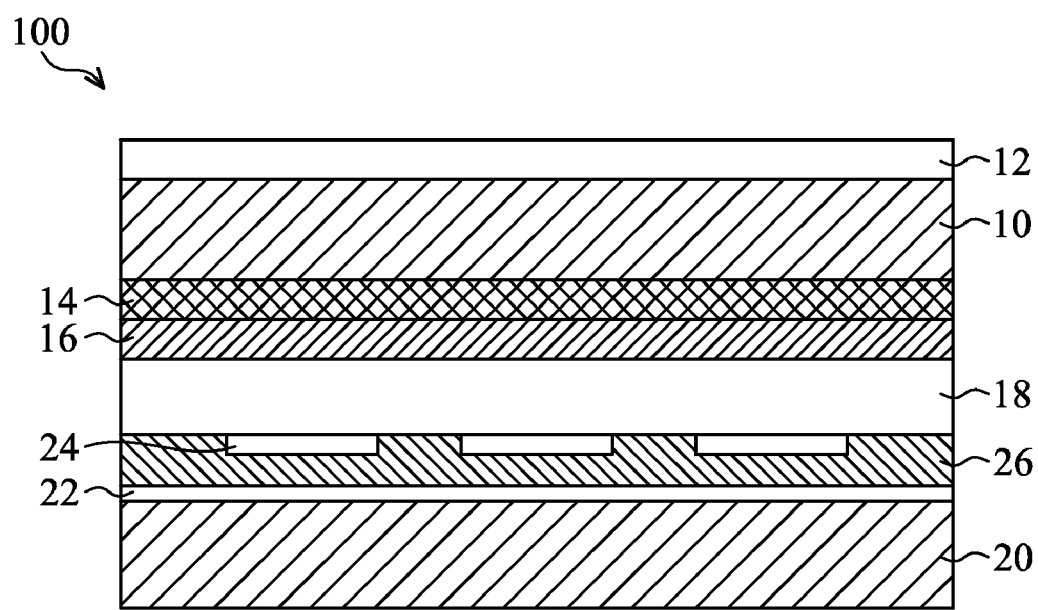
FIG. 1 is a schematic cross section of a conventional IPS or FFS liquid crystal display panel.
Figure 2:
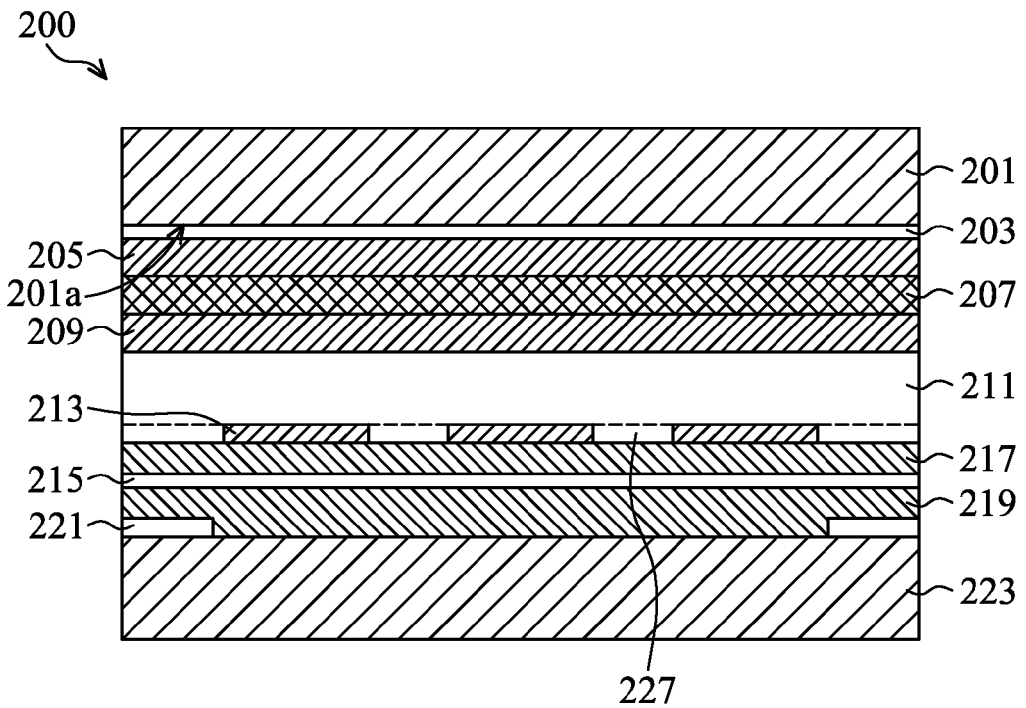
FIG. 2 is a schematic cross section of a liquid crystal display panel according to an embodiment of the invention.

Referring to FIG. 2, a cross section of a liquid crystal display panel 200 according to an embodiment of the present invention is shown. The liquid crystal display panel 200 includes a color filter substrate 201, for example a glass substrate. A conductive layer 203 is formed on an inner surface 201a of the color filter substrate 201, which is used for preventing static electricity discharge produced in the liquid crystal display panel 200. The material of the conductive layer 203 may be such as indium tin oxide (ITO), indium zinc oxide (IZO), or the other suitable transparent conductive materials. The thickness of the conductive layer 203 may be between about 0.01 μm and 0.2 μm, and preferred to be about 0.015 μm. Then, a planarizing layer 205 is formed on the conductive layer 203. In one embodiment, the thickness of the planarizing layer 205 may be about Next, a color filter layer 207 is formed on the planarizing layer 205. The thickness of the color filter layer 207 may be about 2 μm.

Because it is difficult to directly coat the color filter layer 207 on the conductive layer 203, the planarizing layer 205 can be formed on the conductive layer 203 first, and then the color filter layer 207 may be coated on the planarizing layer 205. Next, another planarizing layer 209 is formed on the color filter layer 207. The thickness of the planarizing layer 209 may be about 1.5 μm. The materials of the planarizing layers 205 and 209 may be organic materials, such as a resin.

The liquid crystal display panel 200 further includes an array substrate 223 disposed opposite to the color filter substrate 201. A plurality of orthogonal data lines 221 and scan lines (not shown) is disposed on the array substrate 223. An insulating layer 219 is formed on the data lines 221, and then a lower transparent electrode layer 215 is formed on the insulating layer 219. Next, another insulating layer 217 is formed on the lower transparent electrode layer 215. A patterned upper transparent electrode layer 213 is then formed on the insulating layer 217, wherein the upper transparent electrode layer 213 has slits 227 therein. The materials of the upper transparent electrode layer 213 and the lower transparent electrode layer 215 may be ITO or IZO. The materials of the insulating layers 217 and 219 may be silicon nitride (SiNx). Then, a liquid crystal layer 211 is sandwiched between the array substrate 223 and the color filter substrate 201 to complete the liquid crystal display panel 200. The liquid crystal layer 211 may be formed from a positive or a negative type liquid crystal material. In one embodiment, the liquid crystal layer 211 may have a thickness of about 3 μm.

Then, the color filter substrate 201 can be thinned by a thinning process. After the thinning process, the color filter substrate 201 may have a thickness of about 200 μm. In an embodiment of the liquid crystal display panel 200 of the present invention, the conductive layer 203 is disposed on the inner surface of the color filter substrate 201, such that the conductive layer 203 is not etched after the thinning process of the color filter substrate 201. Therefore, the requirements of thinning the color filter substrate and preventing static electricity discharge in the liquid crystal display panel 200 of the invention can be achieved.

Figure 3:
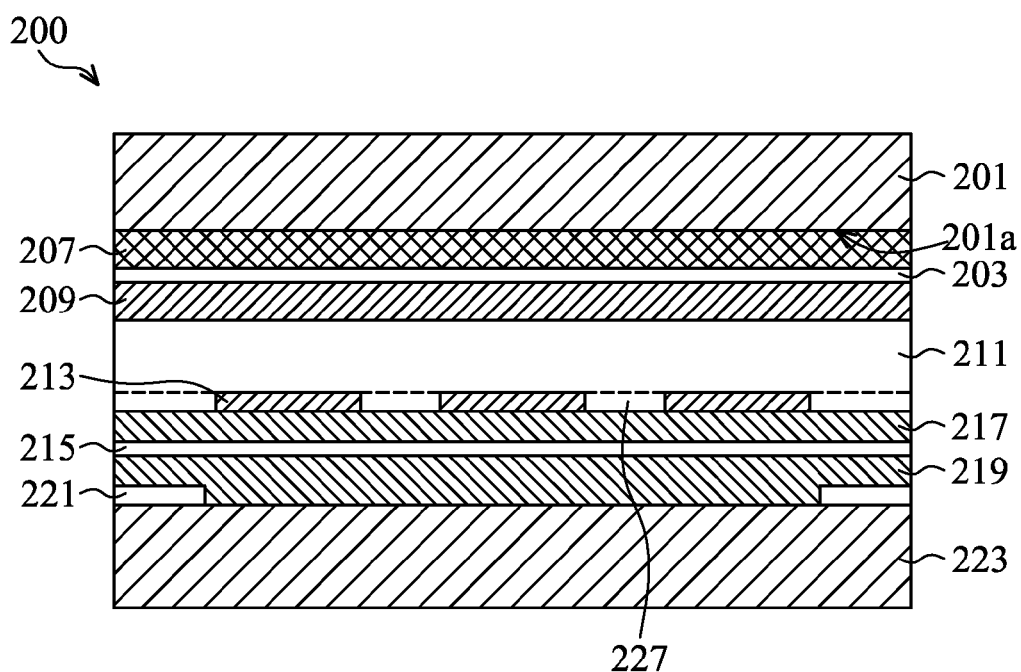
FIG. 3 is a schematic cross section of a liquid crystal display panel according to another embodiment of the invention.

Referring to FIG. 3, a cross section of a liquid crystal display panel 200 according to another embodiment of the present invention is shown. The difference between the liquid crystal display panels of FIG. 2 and FIG. 3 is that the conductive layer 203 of FIG. 3 is disposed between the color filter layer 207 and the planarizing layer 209. The color filter layer 207 is formed on the color filter substrate 201 first, and then the conductive layer 203 is formed on the color filter layer 207. Next, the planarizing layer 209 is formed on the conductive layer 203. Because the conductive layer 203 is easily deposited on the color filter layer 207, the planarizing layer on the color filter layer 207 is not needed to be formed first. The fabrication methods and the structures of the other elements of FIG. 3 are the same as the embodiment of the liquid crystal display panel 200 of FIG. 2, and not repeated again.

Figure 4:
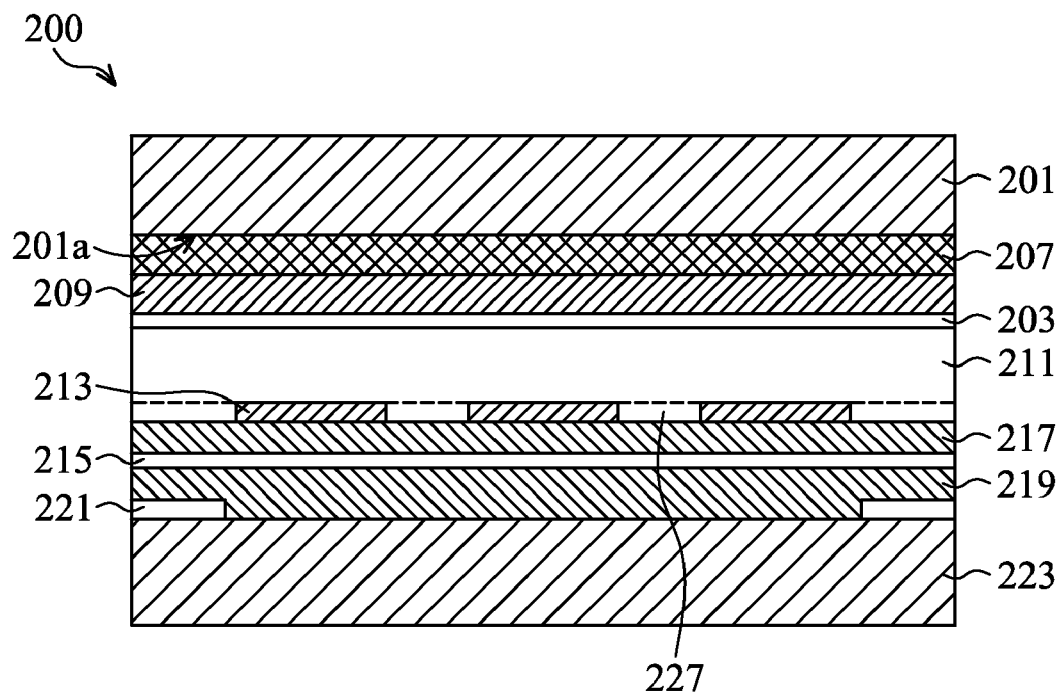
FIG. 4 is a schematic cross section of a liquid crystal display panel according to further another embodiment of the invention.

Referring to FIG. 4, a cross section of a liquid crystal display panel 200 according to further another embodiment of the present invention is shown. The difference between the liquid crystal display panels 200 of FIG. 4 and FIGS. 2 and 3 is that the conductive layer 203 of FIG. 4 is disposed over the color filter layer 207 and the planarizing layer 209. The color filter layer 207 is formed on the color filter substrate 201 first, and then the planarizing layer 209 is formed on the color filter layer 207. Next, the conductive layer 203 is formed on the planarizing layer 209. The fabrication methods and the structures of the other elements of FIG. 4 are the same as the embodiment of the liquid crystal display panel 200 of FIG. 2, and not repeated again.

Figure 5:
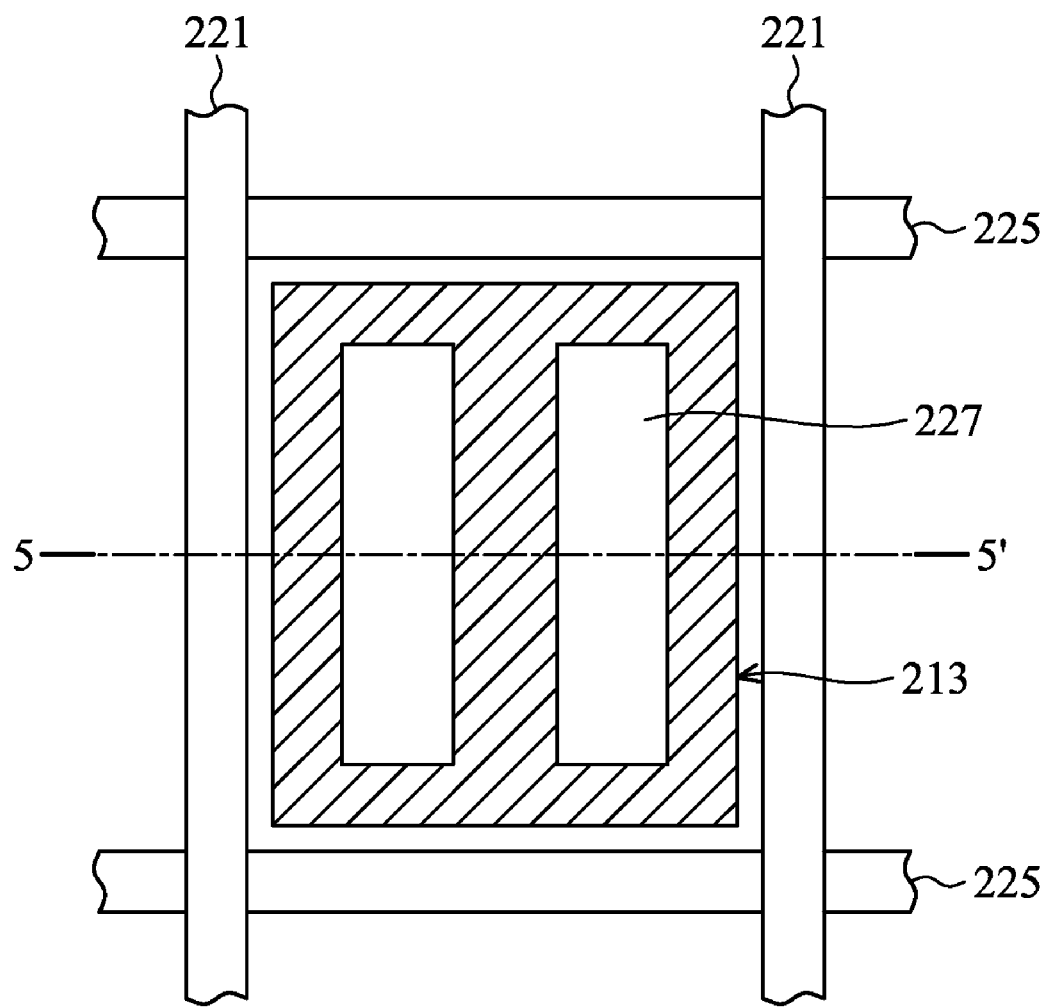
FIG. 5 is a schematic plane view of a upper transparent electrode layer according to an embodiment of the invention.

In the liquid crystal display panel 200, the upper transparent electrode layer 213 is a patterned transparent electrode layer. Referring to FIG. 5, a plane view of the upper transparent electrode layer 213 according to an embodiment of the invention is shown. The cross section of the liquid crystal display panel along the line 5-5' of FIG. 5 can be shown as FIG. 2, 3 or 4. A sub-pixel area can be defined between two adjacent data lines 221 and two adjacent scan lines 225. In the sub-pixel area, the upper transparent electrode layer 213 has a plurality of slits 227 arranged parallel to the data line 221. Although there are two slits 227 shown in FIG. 2, one skilled in the art should appreciate that there may be one or more than two slits disposed in the upper transparent electrode layer 213. Additionally, the slit size and the pitch between the slits also can be adjusted.

Figure 6:
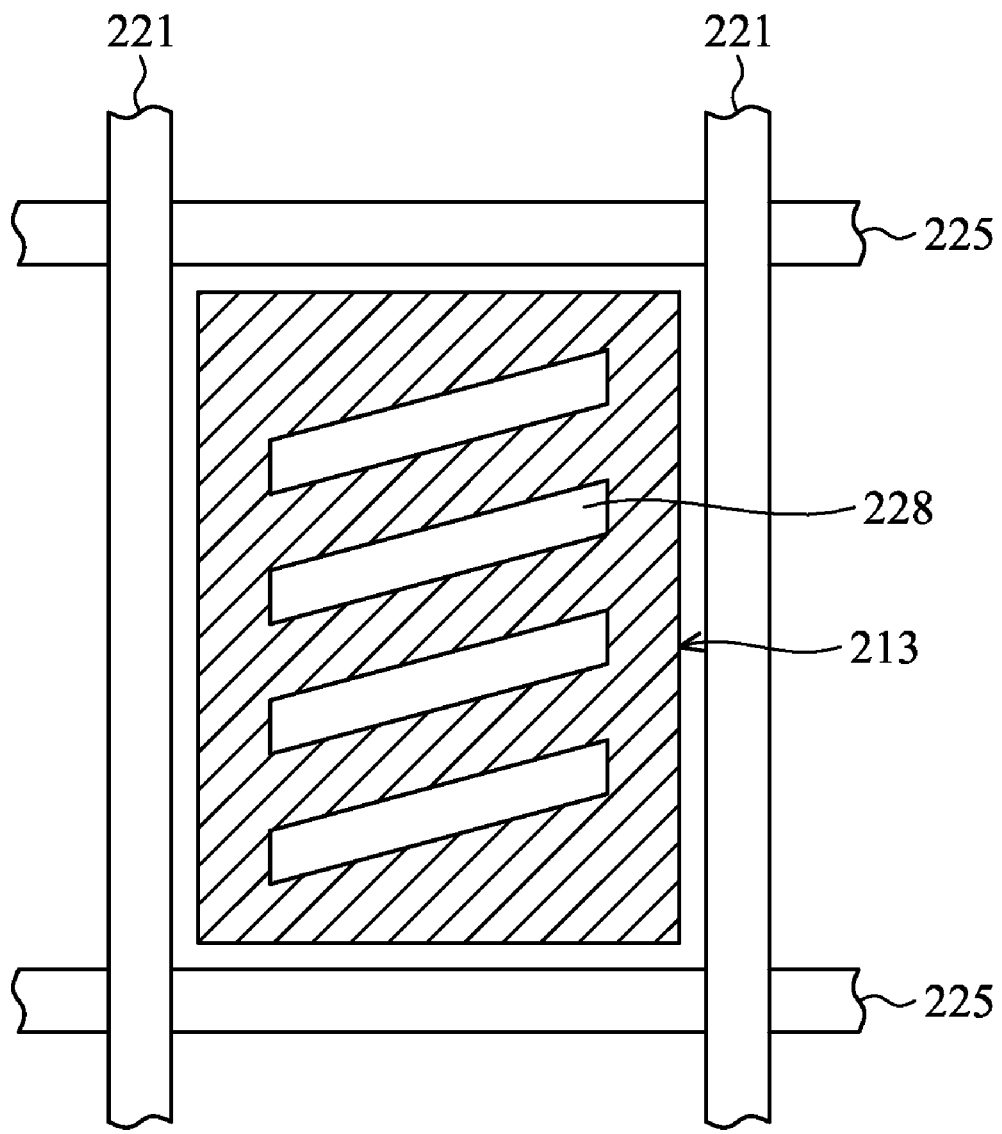
FIG. 6 is a schematic plane view of a upper transparent electrode layer according to another embodiment of the invention.

Referring to FIG. 6, a plane view of the upper transparent electrode layer 213 according to another embodiment of the present invention is shown, wherein the arrangement of a plurality of slits 228 is a mono domain type and the slits 228 are arranged parallel to each other and along a single direction. The difference between the upper transparent electrode layers 213 of FIG. 6 and FIG. 5 is that the plurality of slits 228 are arranged to tilt toward the scan line 225.

Figure 7:
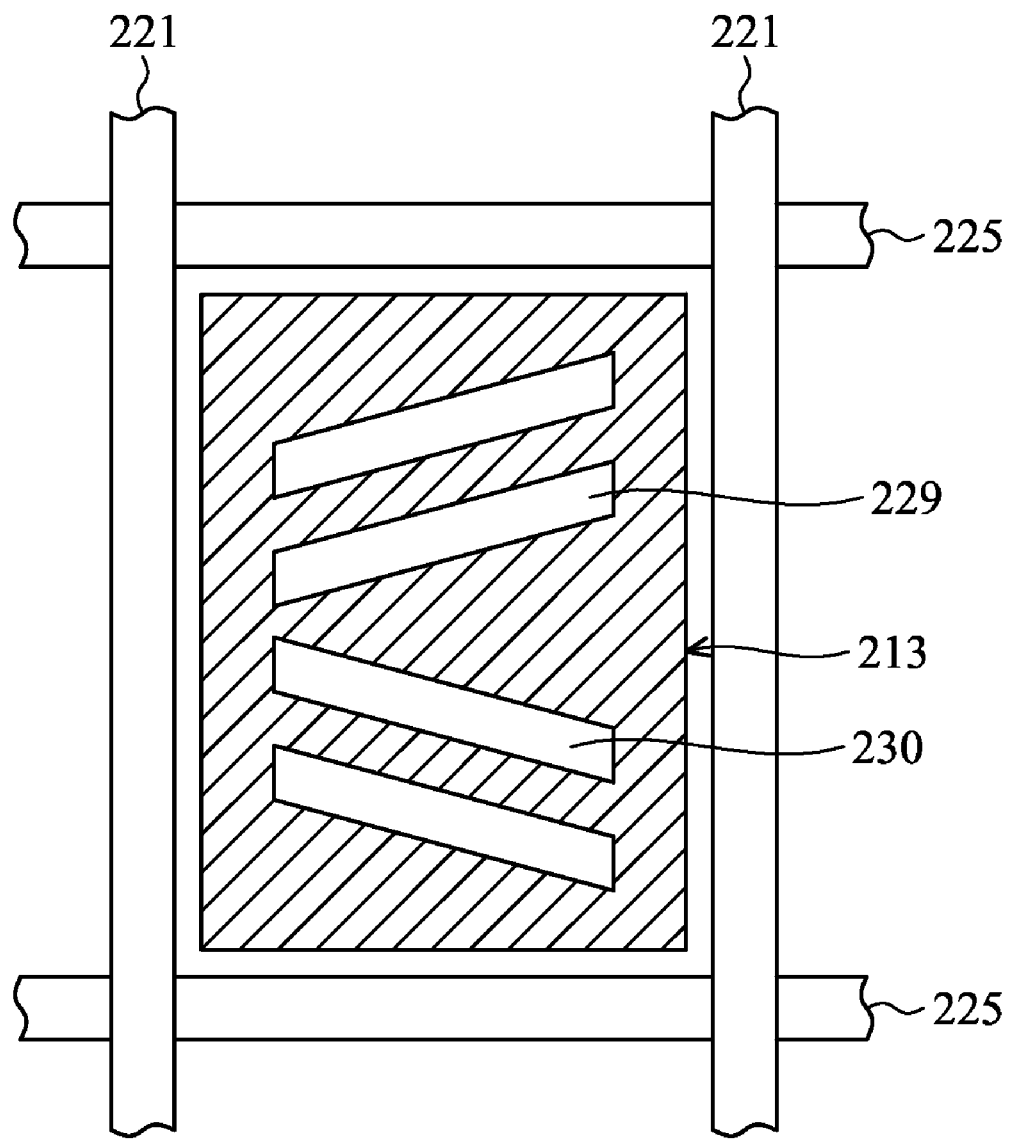
FIG. 7 is a schematic plane view of a upper transparent electrode layer according to further another embodiment of the invention.

Referring to FIG. 7, a plane view of the upper transparent electrode layer 213 according to further another embodiment of the present invention is shown. The difference between the upper transparent electrode layers 213 of FIG. 7 and FIG. 6 is that the arrangement directions of the slits 229 and 230 are different. The arrangement of the slits 229 and 230 is a dual domain type. The slits 229 and 230 are tilted toward the scan line 225 and parallel each other along two directions.

Figure 8:
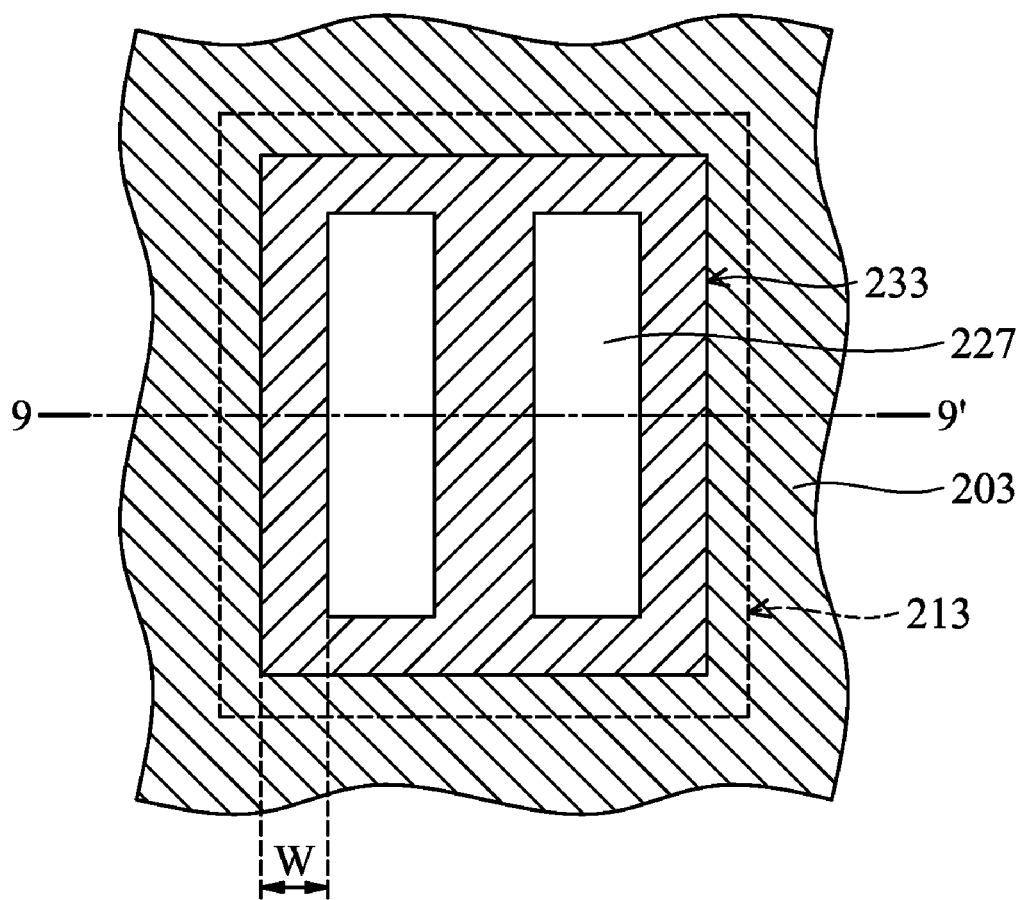
FIG. 8 is a schematic plane view of a relational position between a conductive layer and a upper transparent electrode layer according to an embodiment of the invention.

In an embodiment of the liquid crystal display panel 200 of the present invention, the conductive layer 203 may be a full-up conductive layer or a patterned conductive layer. Referring to FIG. 8, a plane view of a relational position between the conductive layer 203 and the upper transparent electrode layer 213 according to an embodiment of the liquid crystal display panel 200 of the invention is shown, wherein the conductive layer 203 is a patterned conductive layer. The patterned conductive layer 203 has an opening 233 corresponding to the sub-pixel area. An edge of the opening 233 is disposed apart from an edge of the slit 227 of the upper transparent electrode layer 213 with a distance W. The distance W may be between about 0 and 5 μm, i.e. the edge of the opening 233 of the conductive layer may be overlapped or disposed apart from the edge of the slit 227 of the upper transparent electrode layer 213.

Figure 9:
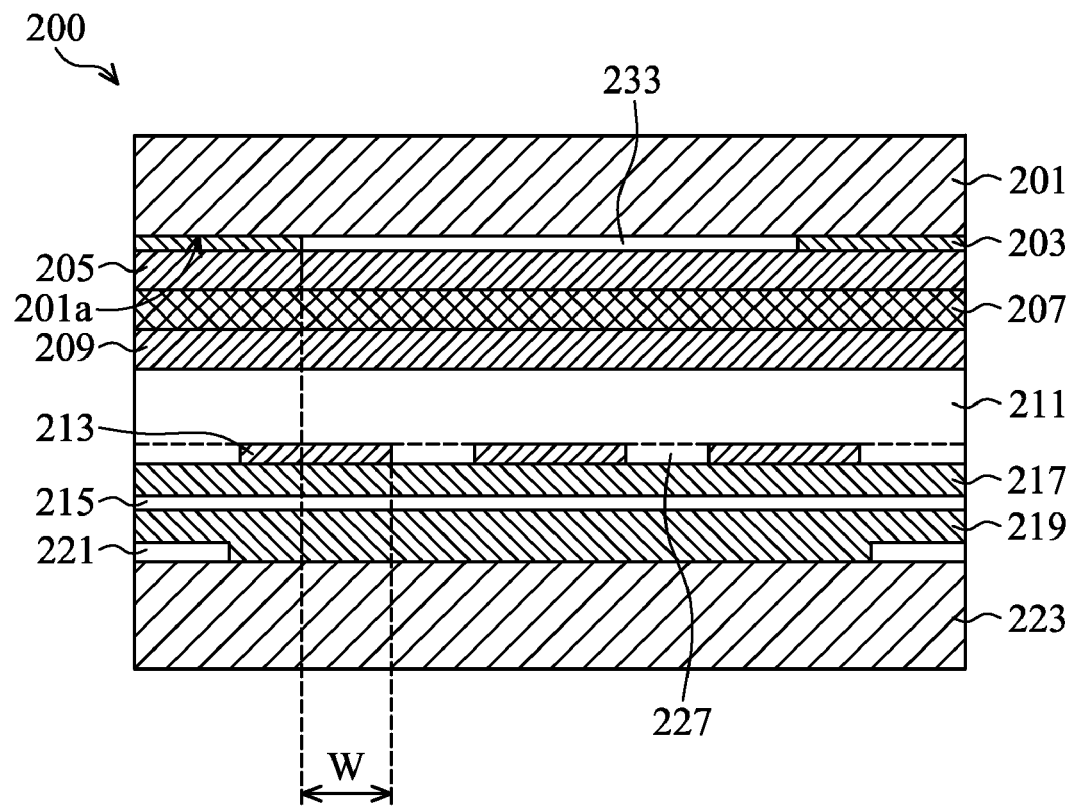
FIG. 9 is a schematic cross section along the line 9-9' of the liquid crystal display panel of FIG. 8 according to an embodiment of the invention.

Referring to FIG. 9, a cross section along the line 9-9' of the liquid crystal display panel of FIG. 8 according to an embodiment of the present invention is shown. The liquid crystal display panel 200 of FIG. 9 is formed similar to the structure of the liquid crystal display panel of FIG. 2. The difference between the liquid crystal display panels of FIG. 9 and FIG. 2 is that the conductive layer 203 of FIG. 9 is a patterned conductive layer with an opening 233 therein. Moreover, the cross section of the liquid crystal display panel along the line 9-9' of FIG. 8 also can be formed similar to the structure of the liquid crystal display panel of FIG. 3 or FIG. 4, wherein the conductive layer 203 is a patterned conductive layer and has the opening 233.

In addition, in an embodiment of the liquid crystal display panel 200 of the invention, a voltage of the conductive layer 203 can be set as non-grounding or grounding voltage, or between 0~8V. Non-grounding means no voltage is applied to the conductive layer 203, such that the voltage of the conductive layer 203 is floating. Grounding means a common voltage (Vcom) is applied to the conductive layer 203. When the conductive layer 203 is a full-up conductive layer and the voltage thereof is floating, the liquid crystal display panel of the invention has a transmission and a contrast ratio equivalent to that of the conventional liquid crystal display panels. When the conductive layer 203 is a patterned conductive layer, the voltage thereof is set as Vcom, and the distance W is greater than 0 µm, the liquid crystal display panel thereof has a transmission and a contrast ratio greater than that of a liquid crystal display panel with a distance W equal to 0 µm, or the conductive layer 203 of a full-up conductive layer.

When the distance W is greater than 0 µm, an oblique electric field is produced in the liquid crystal display panel. A horizontal component of the oblique electric field can make the liquid crystal molecules rotate, such that transmission and contrast of the liquid crystal display panel are enhanced.

Thus, the conductive layer disposed on the inner surface of the color filter substrate in the liquid crystal display panel of the invention can not only satisfy the requirements for thinning the color filter substrate and preventing static electricity discharge in the liquid crystal display panel, but can also reduce the impact on the optical characters of the liquid crystal display panel through the patterned design of the conductive layer.

In order to complete fabrication of the liquid crystal display, one skilled in the art can appreciate that according to the conventional method, a pair of polarizers is also disposed to sandwich the above mentioned liquid crystal display panel and a backlight device is disposed under the lower polarizer. In an embodiment of the invention, the liquid crystal may be a positive type liquid crystal and a pre-tilt angle of the liquid crystal may be 1 degree. A rubbing direction of the liquid crystal may be consistent with a light absorption axis direction of the lower polarizer and a light absorption axis direction of the upper polarizer is perpendicular to the light absorption axis direction of the lower polarizer, so that the liquid crystal display panel can be a normally-black panel.

The liquid crystal display panel of the invention can be applied to the liquid crystal displays with wide viewing angle technology, such as, for example, IPS or FFS liquid crystal displays.

Figure 10:
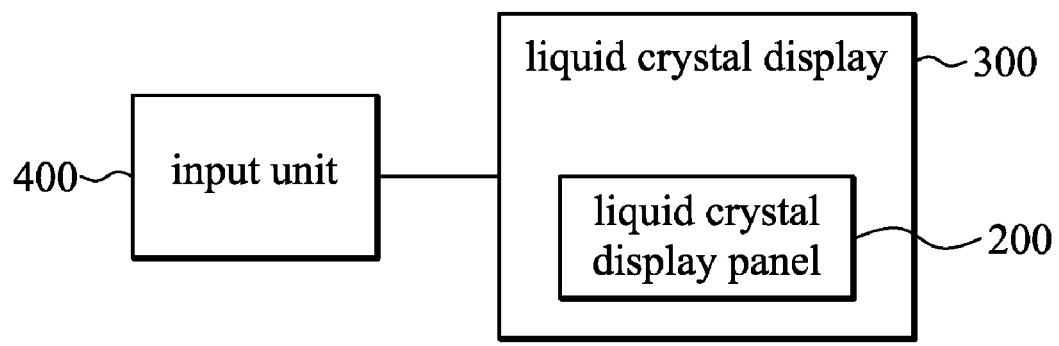
FIG. 10 schematically shows a system for displaying images including the liquid crystal display panel according to an embodiment of the invention.

Referring to FIG. 10, a system 500 for displaying images including the liquid crystal display panel according to an embodiment of the invention is shown. The system comprises a liquid crystal display 300, and the liquid crystal display comprises the liquid crystal display panel 200, a pair of polarizers sandwiching the liquid crystal display panel 200, and a backlight device disposed under the lower polarizer. The liquid crystal display 300 can be a part of an electronic device. In general, the system 500 for displaying images comprises the liquid crystal display 300 and an input unit 400. The input unit 400 is coupled to the liquid crystal display 300 and operative to provide input to the liquid crystal display such that the liquid crystal display displays images. The system 500 for displaying images can be a mobile phone, digital camera, personal data assistant (PDA), notebook computer, desktop computer, television, car display or portable DVD player.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
  a liquid crystal display panel, comprising:
    a first substrate, having a plurality of orthogonal data lines and scan lines thereon;
    a first transparent electrode layer disposed over the data lines;
    a second transparent electrode layer disposed over the first transparent electrode layer;
    a second substrate disposed opposite to the first substrate, having an inner surface;
    a conductive layer disposed on the inner surface of the second substrate; and
    a liquid crystal layer disposed between the first substrate and the second substrate.

2. The system as claimed in claim 1, further comprising a color filter layer and a first planarizing layer disposed on the inner surface of the second substrate.

3. The system as claimed in claim 2, wherein the conductive layer is disposed between the second substrate and the color filter layer.

4. The system as claimed in claim 3, further comprising a second planarizing layer disposed on the conductive layer and between the conductive layer and the color filter layer.

5. The system as claimed in claim 2, wherein the conductive layer is disposed on the color filter layer and between the color filter and first planarizing layer.

6. The system as claimed in claim 2, wherein the conductive layer is disposed on the first planarizing layer and between the first planarizing layer and the first substrate.

7. The system as claimed in claim 1, wherein the conductive layer has a voltage setting comprising non-grounding, grounding, or between 0~8V.

8. The system as claimed in claim 1, wherein the second transparent electrode layer comprises a patterned transparent electrode layer, having a plurality of slits.

9. The system as claimed in claim 8, wherein an arrangement method for the plurality of slits comprises being parallel to the data line, being parallel to each other and tilting toward the scan line along a single direction, or being parallel to each other and tilting toward the scan line along two direction.

10. The system as claimed in claim 8, wherein the conductive layer comprises a patterned transparent electrode layer, having an opening.

11. The system as claimed in claim 10, wherein an edge of the opening of the conductive layer is disposed apart from an edge of the slit of the second transparent electrode layer with a distance.

12. The system as claimed in claim 11, wherein the distance is between 0 to 5 µm.

13. The system as claimed in claim 1, wherein the materials of the first transparent electrode layer, the second transparent electrode layer and the conductive layer comprise indium tin oxide or indium zinc oxide.

14. The system as claimed in claim 1, further comprising a first insulating layer disposed between the data lines and the first transparent electrode layer.

15. The system as claimed in claim 1, further comprising a second insulating layer disposed between the first transparent electrode layer and the second transparent electrode layer.

16. The system as claimed in claim 1, wherein the liquid crystal layer comprises a positive or a negative type liquid crystal material.

17. The system as claimed in claim 1, further comprising a liquid crystal display, wherein the liquid crystal display comprises the liquid crystal display panel.

18. The system as claimed in claim 17, wherein the liquid crystal display comprises an in-plane switching or a fringe-field switching liquid crystal display.

19. The system as claimed in claim 17, further comprising an electronic device, wherein the electronic device comprises:

the liquid crystal display; and an input unit coupled to the liquid crystal display to provide input to the liquid crystal display such that the liquid crystal display displays images.

20. The system as claimed in claim 19, wherein the electronic device comprises a mobile phone, digital camera, personal data assistant (PDA), notebook computer, desktop computer, television, car display or portable DVD player.

* * * * *